United States Patent
McCarthy

(10) Patent No.: US 11,851,629 B2
(45) Date of Patent: Dec. 26, 2023

(54) APPARATUS AND METHOD FOR COLLECTION AND DISPOSAL OF FATS, OIL AND GREASE

(71) Applicant: Martin Franklin McCarthy, Charlotte, NC (US)

(72) Inventor: Martin Franklin McCarthy, Charlotte, NC (US)

(73) Assignee: Martin Franklin McCarthy, Charlotte, NC (US)

( * ) Notice: Subject to any disclaimer, the term of this patent is extended or adjusted under 35 U.S.C. 154(b) by 0 days.

(21) Appl. No.: 18/105,130

(22) Filed: Feb. 2, 2023

(65) Prior Publication Data

US 2023/0183602 A1 Jun. 15, 2023

Related U.S. Application Data

(63) Continuation-in-part of application No. 18/081,290, filed on Dec. 14, 2022, now Pat. No. 11,624,039,
(Continued)

(51) Int. Cl.
*C11B 13/04* (2006.01)
*B01D 17/02* (2006.01)
(Continued)

(52) U.S. Cl.
CPC .......... *C11B 13/04* (2013.01); *B01D 17/0202* (2013.01); *B01D 39/083* (2013.01);
(Continued)

(58) Field of Classification Search
CPC ... C11B 13/04; B01D 17/0202; B01D 39/083; B01D 2239/0266; B01D 2239/0407;
(Continued)

(56) References Cited

U.S. PATENT DOCUMENTS 3,678,662 A 7/1972 Grote
3,862,963 A 1/1975 Hoshi et al.
(Continued)

FOREIGN PATENT DOCUMENTS

CA 2777850 A1 11/2013
CA 2931443 A1 11/2017
(Continued)

OTHER PUBLICATIONS

Hendrasarie et al. 2021 "Combining grease trap and Moringa Oleifera</i> as adsorbent to treat wastewater restaurant" South African Journal of Chemical Engineering 37 (2021) 196-205 (Year: 2021).*
(Continued)

*Primary Examiner* — Liam Royce
(74) *Attorney, Agent, or Firm* — Shumaker, Loop & Kendrick, LLP

(57) ABSTRACT

A method and apparatus for collection and disposal or utilization as a carbon neutral fuel of fats, oil and grease that includes a first porous container, a second porous container, and a grease trap having an inlet and an outlet. The first porous container is positioned proximate the grease trap inlet and the second porous container is positioned proximate the grease trap outlet. The first and second porous containers are formed of a porous fabric and contain an absorbent, organic hydrocarbon material capable of absorbing a quantity of fats, oil and grease. The second porous container may be positioned on either side of the grease trap outlet (within the grease trap or intermediate the outlet and an exit pipe) and may be held in a stationary manner via a tether and/or a hinged door having a flange for capturing and holding the porous container in a stationary manner.

19 Claims, 9 Drawing Sheets

Related U.S. Application Data which is a continuation of application No. 17/685,585, filed on Mar. 3, 2022, now Pat. No. 11,535,812, which is a continuation-in-part of application No. 17/362,168, filed on Jun. 29, 2021, now Pat. No. 11,529,571.

(60) Provisional application No. 63/164,761, filed on Mar. 23, 2021.

(51) Int. Cl.

| | | |
|---|---|---|
| *B01D 39/08* | (2006.01) | |
| *C02F 1/28* | (2023.01) | |
| *C02F 1/40* | (2023.01) | |
| *B01J 20/24* | (2006.01) | |
| *B01J 20/26* | (2006.01) | |
| *E03F 5/16* | (2006.01) | |
| *C02F 101/32* | (2006.01) | |
| *C02F 103/44* | (2006.01) | |
| *C02F 103/32* | (2006.01) | |

(52) U.S. Cl.
CPC .............. *B01J 20/24* (2013.01); *B01J 20/261* (2013.01); *C02F 1/286* (2013.01); *C02F 1/40* (2013.01); *E03F 5/16* (2013.01); *B01D 2239/0266* (2013.01); *B01D 2239/0407* (2013.01); *C02F 2101/32* (2013.01); *C02F 2103/32* (2013.01); *C02F 2103/44* (2013.01)

(58) Field of Classification Search
CPC .......... B01J 20/24; B01J 20/261; C02F 1/286; C02F 1/40; C02F 2101/32; C02F 2103/32; C02F 2103/44; E03F 5/16
See application file for complete search history.

(56) References Cited

U.S. PATENT DOCUMENTS

| | | | |
|---|---|---|---|
| 4,378,229 A | 3/1983 | Leen | |
| 4,925,343 A | 5/1990 | Raible et al. | |
| 5,264,134 A | 11/1993 | McCamy | |
| 5,716,840 A | 2/1998 | Kahler et al. | |
| 5,744,406 A | 4/1998 | Novak | |
| 5,820,762 A * | 10/1998 | Bamer .................. | E03F 5/0404 210/255 |
| 6,010,558 A | 1/2000 | Ackland | |
| 6,365,214 B1 | 4/2002 | Kirk | |
| 6,508,849 B1 | 1/2003 | Comas | |
| 6,517,709 B1 | 2/2003 | Cardwell et al. | |
| 6,818,027 B2 | 11/2004 | Murcia | |
| 7,354,516 B1 | 4/2008 | Young et al. | |
| 7,597,727 B1 | 10/2009 | Morris | |
| 10,066,178 B2 | 9/2018 | Tanel | |
| 10,882,758 B2 | 1/2021 | Sands | |
| 11,339,341 B1 | 5/2022 | McCarthy | |
| 11,529,571 B2 | 12/2022 | McCarthy | |
| 11,535,804 B2 | 12/2022 | McCarthy | |
| 11,535,805 B2 | 12/2022 | McCarthy | |
| 11,535,812 B2 | 12/2022 | McCarthy | |
| 2001/0023007 A1 | 9/2001 | Leriget | |
| 2003/0079400 A1 | 5/2003 | Weissman et al. | |
| 2003/0121802 A1 | 7/2003 | MacQuoid | |
| 2004/0035046 A1 | 2/2004 | Weissman et al. | |
| 2004/0161606 A1 | 8/2004 | Bilkey | |
| 2005/0268542 A1 | 12/2005 | Weissman et al. | |
| 2006/0000767 A1 | 1/2006 | Trauger et al. | |
| 2006/0156621 A1 | 7/2006 | Kraus et al. | |
| 2006/0230673 A1 | 10/2006 | Barford et al. | |
| 2007/0029247 A1 | 2/2007 | Alpert | |
| 2007/0169409 A1 | 7/2007 | Chang | |
| 2009/0014087 A1 | 1/2009 | Fevag | |
| 2009/0200241 A1 | 8/2009 | Harman et al. | |
| 2011/0000854 A1 | 1/2011 | Nichols et al. | |
| 2012/0006761 A1 | 1/2012 | Parker et al. | |
| 2012/0251597 A1 | 10/2012 | Gupta et al. | |
| 2012/0311972 A1 | 12/2012 | Hunter | |
| 2013/0056369 A1 | 3/2013 | Jorgensen | |
| 2014/0087315 A1 | 3/2014 | Doyle et al. | |
| 2015/0322361 A1 | 11/2015 | Creutzmann | |
| 2017/0081271 A1 | 3/2017 | Townsend | |
| 2017/0226440 A1 | 8/2017 | Fandrich et al. | |
| 2019/0040593 A1 | 2/2019 | Tetrault et al. | |
| 2019/0176059 A1 | 6/2019 | Zock | |
| 2021/0002571 A1 | 1/2021 | Zeitler et al. | |
| 2021/0070640 A1 | 3/2021 | Yaman et al. | |

FOREIGN PATENT DOCUMENTS

| | | |
|---|---|---|
| CN | 213253724 U | 5/2021 |
| DE | 102009013985 A1 | 9/2010 |
| DE | 102012104574 A1 | 12/2013 |
| DE | 202014001312 U1 | 3/2014 |
| DE | 202019003324 U1 | 8/2019 |
| EP | 2216387 A1 | 8/2010 |
| EP | 3750853 A1 | 12/2020 |
| FR | 2989384 A1 | 10/2013 |
| GB | 2368261 A | 5/2002 |
| GB | 2389858 B | 1/2005 |
| KR | 10-1953361 B1 | 2/2019 |
| WO | 2007009249 A1 | 1/2007 |
| WO | 2008141752 A1 | 11/2008 |
| WO | 2012062324 A1 | 5/2012 |
| WO | 2013108223 A1 | 7/2013 |
| WO | 2014-068316 A1 | 5/2014 |
| WO | 2017152229 A1 | 9/2017 |
| WO | 2019145944 A1 | 8/2019 |

OTHER PUBLICATIONS

U.S. Non-Final Office Action for U.S. Appl. No. 18/081,295 dated Feb. 2, 2023 (24 pages).
Notice of Allowance (NOA) issued for U.S. Appl. No. 18/081,295 dated Apr. 5. 2023 (7 pages).
International Search Report (ISR) and Written Opinion (WO) for PCT/EP2022/021203 dated Jul. 21, 2022 (13 pages.).
Mathavan, G.N. et al. 1989. Use of peat in the treatment of oily waters. Water, Air, and Soil Pollution 45: 17-26. (Year: 1989).
Pintor, A.M.A. 2016. Oil and grease removal from wastewaters. Sorption treatment as an alternative to state-of-the- art technologies. A critical review. Chemical Engineering Journal 297 (20216) 229-255 (Year: 2016).
Non-Final Office Action issued for U.S. Appl. No. 17/362,168, dated Jul. 20, 2022 (9 pages).
Non-Final Office Action issued for U.S. Appl. No. 17/736,601, dated Jul. 22, 2022 (17 pages).
Non-Final Office Action issued for U.S. Appl. No. 17/685,565, dated Aug. 17, 2022 (21 pages).
International Search Report (ISR) and Written Opinion (WO) for PCT/EP2022/021205 dated Jun. 8, 2022 (9 pages).
Olga et al., Cleanup of Water Surface from Oil Spills Using Natural Sorbent Materials, National Research Tomsk Polytechnic University, Procedia Chemistry 10 (2014), pp. 145-150.
City of Dothan Alabama, Fats, Oils and Grease (FOG) Science, dated Oct. 27, 2020, Retrieved from https:/www.dothan.org/DocumentCenterNiew/3032/FOG--Science?bidld, 7 pages.
Finney et al., 2009 "Fuel pelletization with a binder: part I—identification of a suitable binder for spent mushroom compost-coal tailing pellets". Energy & Fuels 23, 3195-3202. (Year: 2009).
Abomohra et al. 2020 "Potential of fat, oil and grease (FOG) for biodiesel production: A critical review on the recent progress and future perspectives" Progress in Energy and Combustion Science 81 (Year: 2020).
Notice of Allowance (NOA) issued for U.S. Appl. No. 17/362,168, dated Oct. 31, 2022 (10 pages).
Final Rejection issued for U.S. Appl. No. 17/685,565, dated Sep. 23, 2022 (8 pages).

(56) References Cited

OTHER PUBLICATIONS

Notice of Allowance (NOA) issued for U.S. Appl. No. 17/685,565, dated Oct. 31, 2022 (9 pages).
Corrected Notice of Allowance (NOA) issued for U.S. Appl. No. 17/685,565, dated Nov. 3, 2022 (9 pages).
Final Rejection issued for U.S. Appl. No. 17/736,601, dated Sep. 23, 2022 (9 pages).
Notice of Allowance (NOA) issued for U.S. Appl. No. 17/736,601, dated Oct. 31, 2022 ( 9 pages).
Non-Final Office Action issued for U.S. Appl. No. 17/685,585, dated Jul. 20, 2022 (11 pages).
Notice of Allowance (NOA) issued for U.S. Appl. No. 17/685,585, dated Nov. 2, 2022 (11 pages).
U.S. Final Rejection issued for U.S. Appl. No. 18/081,295 dated Mar. 3, 2023 (15 pages).
Notice of Allowance (NOA) issued for U.S. Appl. No. 18/081,290 dated Feb. 14, 2023 (12 pages).
Non-FInal Office Action (NFOA) issued for U.S. Appl. No. 18/214,041 dated Aug. 25, 2023 (14 pages).
Final Rejection issued for U.S. Appl. No. 18/214,041 dated Nov. 2, 2023 (12 pages).

\* cited by examiner

APPARATUS AND METHOD FOR COLLECTION AND DISPOSAL OF FATS, OIL AND GREASE

TECHNICAL FIELD

The present invention relates to apparatuses and methods for collection and disposal of fats, oil and grease.

BACKGROUND

The National Pretreatment Program implements Clean Water Act requirements to control pollutants that are introduced into publically-owned treatment works ("POTWs"). As part of this program, EPA has promulgated General Pretreatment Regulations that require the establishment of State and local pretreatment programs to control pollutants, which pass through or interfere with POTW treatment processes or may contaminate POTW sewage sludge. Meeting these requirements may require elimination of interference caused by the discharge to POTWs of Fats, Oil, and Grease (FOG) from food service establishments (FSE). More specifically, the Pretreatment Program regulations at 40 CFR § 403.5(b)(3) prohibit "solid or viscous pollutants in amounts which will cause obstruction" in the POTW and its collection system. EPA's Report to Congress on combined sewer overflows (CSOs) and sanitary sewer overflows (SSOs) identified that "grease from restaurants, homes, and industrial sources are the most common cause (47%) of reported blockages. Grease is problematic because it solidifies, reduces conveyance capacity, and blocks flow."

Controlling FOG discharges will help POTWs prevent blockages that impact CSOs and SSOs, which cause public health and water quality problems.

FOG wastes are generated at food service establishments as byproducts from food preparation, and cleaning activities for pans, dishes, utensils and other surfaces. FOG captured on site is generally classified into two broad categories. The first type is yellow grease that is the byproduct of deep-frying, and often captured in large containers, then ultimately sold into the reuse market. The second type of FOG, and the focus of this application, is the FOG that is washed down the sink and floor drains into a grease trap or other similar trap. This FOG is a result of cleaning pans, plates, utensils, and other grease-laden surfaces in the food service industry and other similar establishments. The annual production of grease trap waste is massive. Currently, FOG that escapes a trap creates upwards of 40,000 sanitary sewer overflows per year. Food service establishments create volumes of FOG that run from 800 to 1,700 pounds per year. Fog capture device Food service establishments can adopt a variety of best management practices or install interceptor/collector devices to control and capture the FOG material before discharge to the POTW collection system. For example, instead of discharging yellow grease to POTWs, food service establishments often accumulate this material for pick up by consolidation service companies for re-sale or re-use in the manufacture of tallow, animal feed supplements, fuels, or other products.

Additionally, food service establishments can install interceptor/collector devices (e.g., grease traps) in order to accumulate FOG on-site and prevent it from entering the POTW collection system. In many cases, an establishment that implements best management practices will realize financial benefit through a reduction in their required grease interceptor and trap maintenance frequency.

Likewise, more and more POTWs are addressing FOG discharges by imposing mandatory measures of various types, including inspections, periodic grease pumping, stiff penalties, and even criminal citations for violators, along with 'strong waste' monthly surcharges added to restaurant sewer bills.

Pretreatment programs are developing and using inspection checklists for both food service establishments and POTW pretreatment inspectors to control FOG discharges. Additionally, the EPA identified typical numeric local limits controlling oil and grease in the range of 50 mg/L to 450 mg/L with 100 mg/L as the most commonly reported numeric pretreatment limit.

With this information in mind, it is apparent that while there has been some progress in collecting and disposing of FOG, much more needs to be done. In particular, there is a need for low-impact collection and disposal apparatuses and methods that rely on natural, biodegradable materials requiring low energy consumption usable in a wide variety of applications and at low cost. Implementation of FOG mitigation measures will have a corresponding benefit on sludge application on farmland since FOG has little or no benefit as a nutrient for plants and crops.

SUMMARY

This summary is provided to briefly introduce concepts that are further described in the following detailed description. This summary is not intended to identify key features or essential features of the claimed subject matter, nor is it to be construed as limiting the scope of the claimed subject matter.

In example embodiments, a method of capturing fats, oil and/or grease for utilization as a carbon neutral fuel or for disposal includes the following steps: providing a first porous container formed of a porous fabric, wherein the first porous container includes a plurality of pores with an apparent opening size (AOS) of 0.25 mm to 0.5 mm; providing a second porous container formed of a porous fabric, wherein the second porous container also includes a plurality of pores with an apparent opening size (AOS) of 0.25 mm to 0.5 mm; positioning in each of the first porous container and the second porous container an absorbent material capable of absorbing a quantity of fats, oil and grease through the porous fabric of the first and second porous containers, where the absorbent material is formed of an organic hydrocarbon absorbent material; and placing the first and second porous containers and the absorbent material contained therein in a grease trap. The first porous container is positioned proximate a grease trap inlet and the second porous container is positioned proximate a grease trap outlet. The method further includes removing the first and second porous containers from the grease trap and transporting them to a location for processing for disposal or for use as a carbon natural fuel.

In another embodiment, an apparatus for collection of fats, oil, and grease for utilization as a carbon neutral fuel or for disposal is disclosed. The apparatus includes a first porous container formed of a porous fabric, a second porous container formed of a porous fabric, and a grease trap having an inlet and an outlet, where the grease trap includes a source of fats, oil and/or grease. Each of the first porous container and the second porous container have an absorbent material capable of absorbing a quantity of fats, oil and grease through the porous fabric. The absorbent material is an organic absorbent material. The first porous container and the absorbent material contained therein is positioned proximate the grease trap inlet, and the second porous container and the absorbent material contained therein is positioned proximate the grease trap outlet.

Accordingly, the invention of this application employs a specially-designed container, such as but not limited to an absorbent tube or mat into which FOG can be introduced for collection, transport, and disposal. In one example, an elongate tube or absorbent mat geotextile is used to contain sphagnum peat, mushroom compost materials, orange peels, or an absorbent polymeric material and to maximize contact surface area with the FOG materials in, for example, a grease trap. The sphagnum peat, mushroom compost, and orange peels are obtained from select locations in the United States or Canada known for this type of specialized product. Selected varieties of sphagnum peat and/or mushroom compost are observed to create a slight charge on the surface of the sphagnum peat and/or mushroom compost particles that draw the FOG from the surface water in the grease trap down to several inches below the surface. As used in this application, peat, mushroom and similar materials into which the FOG is absorbed are referred to generally and broadly as "capture materials" or "absorbent materials." In certain aspects, it is contemplated that orange peels may be used as a capture or absorbent material. Likewise, the absorbent material may be a polymeric material such as a polyolefinic material and more preferably a polypropylene having oleophilic and hydrophobic properties that are ideal to absorb fat, oil, and/or grease. In certain aspects, the absorbent material is an oleophilic and hydrophobic material/matrix configured to absorb fats, oils, and/or greases while repelling and/or filtering out water from, for example, a mixture of water, fats, oils, and greases.

Products suitable for use in the FOG tube described in this application, include, but are not limited to, wood fiber, orange peels, mushroom compost, and sphagnum peat moss processed and sold by various distributors and manufacturers. In particular, the peat moss product is an all organic hydrocarbon absorbent, manufactured from large fiber sphagnum peat moss. The manufacturing process produces a product, which becomes both oleophilic, absorbing hydrocarbons and hydrophobic, i.e., repelling water. Due to its fibrous structure and processing, peat absorbs hydrocarbons quickly on contact by virtue of its wicking capillary action and encapsulates oil on contact. This makes peat ideal for hydrocarbon cleanup both on open water and land applications. Peat absorbs, on average, eight times its weight. This volume will vary based on the hydrocarbon being absorbed and the temperature of the environment where it is absorbed. In certain aspects, orange peels have the same oleophilic and hydrophobic characteristics as those mentioned above.

In certain aspects, the grease absorbent material is oleophilic and hydrophobic material/matrix configured to absorb fats, oils, and/or greases while repelling and/or filtering out water from, for example, a mixture of water, fats, oils, and greases. According to another aspect of the invention, the fat, oil and/or grease absorbent capture material is selected from the group consisting of an organic material such as sphagnum peat, mushroom compost, and orange peels. According to another aspect of the invention, the fat, oil and/or grease capture material is selected from an absorbent porous, polymeric material that is preferably oleophilic and hydrophobic. In this aspect, the absorbent porous, polymeric material is a polyolefinic material and more preferably a polypropylene having oleophilic and hydrophobic properties that are ideal to absorb fat, oil, and/or grease.

According to another aspect of the invention, the fat, oil and/or grease is present in a range of between 88-75 percent and the capture material is present in a range of between 12 and 25 percent.

This type of natural cleansing and separation is one of the unique features of this invention and why it is useful to restaurants, industrial facilities and car repair shops that struggle with the maintenance of grease traps and oil spills. Once trapped in the tube or mat, the product can be easily and compactly shipped to a location for disposal, incineration or further processing, including processing the materials for use as fuel.

In recent years, the EPA and many large water and sewer districts have realized that application of sewage sludge and FOG materials on farm land is not a good fertilizer and has unintended long term consequences. Sewage Sludge Incineration (SSI) is becoming a safe and effective alternative around densely populated municipalities where land application of sewage sludge is less desirable. One of the benefits of the sphagnum peat FOG absorbent tubes and mats is that they comprise a high BTU fuel that can be used to increase the efficiency of SSI processes. In addition to providing a better and more efficient way for collecting and disposal of FOG, the product can separate the higher density grease and oil so that it can be disposed of in a landfill, and/or burned as fuel in a sludge incinerator.

The separation and reduction of volume in the partially emulsified liquid FOG material at the source in the grease trap will reduce the amount of liquid FOG that is land applied and/or causes problems with the sludge management at the wastewater plant.

Moreover, it is another object of the invention to provide an improved apparatus and method for collection and disposal of fats, oils, and greases. In addition, the invention includes guidelines on where to place the FOG elongate tube or absorbent mat so that it maximizes collection of FOG, and follows local, state and Federal guidelines for grease traps and other interceptor and separation devices.

It is another object of the invention to provide an improved apparatus and method for collection and disposal of fats, oil and grease that provide enhanced environmental remediation.

It is another object of the invention to provide an improved apparatus and method for collection and disposal of fats, oil and grease that provides for the ability to utilize natural, renewable, biodegradable materials in the collection and disposal process.

It is another object of the invention to provide an improved apparatus and method for collection and disposal of fats, oil and grease that provides for the ability to separate the higher density grease and oil so that it can be disposed in a landfill, and/or burned as fuel in a sludge incinerator.

It is another object of the invention to utilize containers, such as tubes, mats and other configurations of this material to capture spills of oil and other hydrocarbons at vehicle repair facilities.

According to one aspect of the invention, an apparatus for collection and disposal of fats, oil and grease is provided that includes an elongate fabric tube having at least one open end, a biodegradable material capable of absorbing a large quantity of fats, oil and grease positioned in the tube through the open end. The tube and the contained biodegradable material is adapted for being placed in a source of fat, oil and/or grease for absorbing the fat, oil and/or grease into the biodegradable material for removal from the source and for transport to a location for processing. The tube preferably includes a closure for closing the open end of the tube with the biodegradable material positioned within the tube.

According to another aspect of the invention, an apparatus is provided for collection and disposal of fats, oil and grease and includes a container formed of a fabric having a multiplicity of openings and at least one open end. The container is adapted to receive an absorbent material into the container capable of absorbing a quantity of fats, oil and grease, the container and biodegradable material adapted for being placed in a source of fat, oil and/or grease for absorbing the fat, oil and/or grease for removal from the source and for transport to a location for processing. A closure is provided for closing the open end of the container with the biodegradable material positioned within the container.

According to another aspect of the invention, the fabric is a geotextile.

According to another aspect of the invention, the fabric is a biodegradable material.

According to another aspect of the invention, the fabric is constructed of a biodegradable yarn selected from the group consisting of cotton, hemp, ramie or jute.

According to another aspect of the invention, the fabric is constructed of a synthetic yarn.

According to another aspect of the invention, the fabric has an apparent opening size (AOS) of 0.25 mm to 0.5 mm. In this aspect, the AOS of the container is smaller than the size(s) of the absorbent material positioned therein such that the absorbent material remains within the container until being released/removed from the container.

According to another aspect of the invention, the container is a tube.

According to another aspect of the invention, the tube includes one closed end and an open end adapted for being closed after being filled with the absorbent material.

According to another aspect of the invention, the tube includes an element adapted for receiving an elongate cord for allowing the tube to be lowered into and raised out of a source of FOG and to be tethered proximate the source of FOG.

According to another aspect of the invention, the fat, oil and/or grease absorbent material is selected from the group consisting of sphagnum peat, mushroom compost, orange peels, and polypropylene. In certain aspects, each of these absorbent materials are oleophilic and hydrophobic and are configured to absorb fats, oils, and/or greases while repelling and/or filtering out water from, for example, a mixture of water, fats, oils, and greases.

According to another aspect of the invention, the container is a three dimensional mat. The three dimensional mat preferably includes one or more planar surfaces. For example, in certain aspects, the mat includes a planar upper surface, a planar lower surface, and planar side surfaces. In certain additional aspects, the three dimensional mat is comprised of the absorbent material disclosed herein.

According to another aspect of the invention, the mat includes one closed end and an open end adapted for being closed after being filled with the absorbent material.

According to another aspect of the invention, the mat includes an element adapted for attaching an elongate cord to the mat for allowing the mat to be lowered into and raised out of a source of fat, oil and/or grease and to be tethered proximate the source of fat, oil and/or grease.

According to another aspect of the invention, the fat, oil and/or grease absorbent material is selected from the group consisting of sphagnum peat and mushroom compost.

According to another aspect of the invention, a method of capturing and disposing of fat, oil and/or grease is provided and includes the steps of providing a container formed of a fabric having a multiplicity of openings and at least one open end, positioning in the container an absorbent material capable of absorbing a quantity of fat, oil and grease, placing the container and biodegradable material contained therein in a source of fat, oil and/or grease for absorbing the fat, oil and/or grease, removing the container of absorbent material and absorbed fat, oil and/or grease from the source of fat, oil and/or grease, and transporting the removed container to a location for processing.

According to another aspect of the invention, the method includes the step of incinerating the container, the absorbed material and absorbed fat, oil and/or grease.

According to another aspect of the invention, the step of providing a container includes the step of providing a tube adapted to receive the absorbent material.

According to another aspect of the invention, the step of providing a container includes the step of providing a mat adapted to receive the absorbent material.

According to another aspect of the invention, the method includes the step of tethering the container proximate the source of fat, oil and/or grease.

According to another aspect of the invention, the method includes the step of providing a closure for closing the open end of the container with the biodegradable material positioned within the container.

In additional aspects, the FOG absorbent material may be used alone (i.e., excluding the previously mentioned container that contains the absorbent material and/or the absorbent material separated from the container) to absorb FOG when forming/producing the biofuel product (i.e., the absorbent material having FOG absorbed therein). When used in this manner, a user (e.g., technician) places a desired, predetermined amount of absorbent material within, for example, a grease trap (or other container having FOG therein). The user then allows an adequate time for the absorbent material to absorb and preferably become saturated with FOG thereby forming the biofuel product. Subsequently the user removes the biofuel product from, for example, the grease trap for subsequent use and/or processing steps to be used as the biofuel product. During the removal step of the biofuel product (i.e., absorbent material having FOG absorbed therein) in the above mentioned process, it is further envisioned that a positive pressure pump (e.g., a modified pool pump such as the Pentair line of pool pumps) and other removal aids will be used to further expedite the overall process to remove the biofuel from the grease trap in an expeditious and efficient manner.

In the above mentioned method, the technician arrives at the grease trap to be serviced and removes the grease trap's lid. Next, the amount of absorbent material to be introduced into the grease trap will be determined by the technician visually inspecting and assessing the overall volume of the grease trap along with the ratio of FOG to brown water contained therein. The technician next introduces a sufficient amount of the loose absorbent material (e.g., 1 pound, 5 pounds, 10 pounds, 20 pounds, etc.—termed the "first amount" or "initial amount") into the trap to allow for the desirable amount of absorption of FOG into the absorbent material. In preferable aspects, the desirable amount of FOG absorption into the absorbent material is 5%, 10%, 20%, 30%, 40%, 50%, 60%, 70%, 80%, 90%, 95%, 98%, or 100% of the FOG within the grease trap.

After a predetermined time period in which absorption of FOG into the absorbent material has occurred, the grease trap is again visually inspected and assessed to further determine whether any FOG remains, and if so, to further determine the ratio of FOG to brown water remaining in the grease trap. At that time, more absorbent material (a "second amount" of absorbent material) may be added to absorb the remaining FOG (i.e., FOG that was not absorbed by the previously provided absorbent material). Subsequent amounts of absorbent material (e.g., "third amount", "fourth amount", "fifth amount", etc.) may be added by the technician until the desirable amount of FOG absorption (and desired FOG to brown water ratio) has been reached. After reaching the desired FOG absorption amount in the absorbent material (and the desired FOG to brown water ratio), the absorbent material having FOG absorbed therein (biofuel) may be subsequently removed all at once by the removal step/process discussed further below.

As an alternative to the above, an absorbing step followed by an immediate removal step may be used. In this aspect, the absorbent material (i.e., first amount or initial amount) is added to the grease trap and after a predetermined time period FOG is absorbed into the absorbent material forming the biofuel. Next, the biofuel (i.e., first amount of absorbent material having FOG absorbed therein) is removed from the grease trap. After removal of the absorbent material having FOG absorbed therein (i.e., biofuel) from the grease trap, the technician may again visually inspect and assess the grease trap to determine whether any additional FOG remains therein. If so, the technician may again, introduce the absorbent material ("second amount" of absorbent material) and allow for absorption of FOG into the second amount of absorbent material (biofuel). Subsequently, the second amount of absorbent material having FOG absorbed therein is removed from the grease trap. The above mentioned steps (i.e., absorbing FOG by the absorbent material followed by an immediate removing step until a desirable FOG to brown water ratio and/or FOG absorption amount in the absorbent material has been reached) may be repeated as desired by the technician.

To further aid in the removing/removal steps (i.e., removing the biofuel comprising the absorbent material having FOG absorbed therein), additional removal tools and aids may be used. For example, the technician may use a rake or rake-like device to actuate the absorbent material, FOG, and/or brown water in the grease trap and to spread the absorbent material more evenly on the surface of the FOG/water mixture within the grease trap. This step advantageously increases the rate of absorption into the absorbent material and further expedites the FOG capture and removal process from the grease trap. During this step, the absorbent material having FOG absorbed therein is hydrophobic and will continue to float even when saturated with FOG.

At this point, the technician may further utilize a positive pressure pump (a modified pool pump such as the Pentair line of pool pumps) to pump the biofuel (i.e., FOG laden absorbent material) from the top, or uppermost, portion of the grease trap and to remove the biofuel therefrom via a filter and/or physically removal (e.g., via a net or another similar removal device). During the removal process and while using the pump, the pump will beneficially circulate the brown water back into the grease trap thereby keeping the grease trap maximally efficient and effective. The maximum efficiency of the grease trap is achieved by keeping the grease trap full of water during the removal process.

While pumping the FOG. laden absorbent material out of the grease trap, the technician moves the end of the hose around the top and/or uppermost sections of the grease trap surface until all of the biofuel (i.e., absorbent material having FOG absorbed therein) has been removed from the grease trap.

After the biofuel (i.e., absorbent material laden with FOG and/or absorbent material having FOG absorbed therein) has been captured and removed from the grease trap and the unencumbered water drained from the positive pressure pump hoses into the grease trap, the grease trap lid is closed securely. Then the technician either transports the biofuel to another location, or leaves the biofuel in a secure area for subsequent removal and processing.

In certain aspects, the method of forming a biofuel by capturing fats, oil and/or grease in a grease trap are disclosed. In view of the above disclosures, this method may include comprising the steps of: (a) adding an absorbent material to the grease trap that has a mixture of water, fats, oil, and grease therein; the absorbent material comprising a hydrophobic and oleophilic material configured to absorb between two to eight times its weight of fats, oil, and/or grease; (b) forming a biofuel by absorbing over a predetermined period of time fats, oil, and/or grease within the absorbent material such that the absorbed fats, oil, and/or grease within the absorbent material are separated from the water within the grease trap; (c) removing the biofuel from the grease trap while the separated water of step (b) remains in the grease trap; and (d) optionally transporting the biofuel to a secure location for storage and/or incineration. In certain aspects, step (d) is included in the above method. Within the above method, the absorbent material is loose, contained within a container comprising a tube adapted to receive and securely hold the absorbent material therein, or formed as a mat. Within the above method, the absorbent material consists of at least one of sphagnum peat, mushroom compost, orange peels, and polypropylene. Within the above method, the absorbent material is configured to absorb between four to eight times its weight of the fats, oil, and/or grease. Within the above method, before step (a) the volume of a grease trap and fats, oil, and/or grease relative to the water therein are visually assessed to determine an amount of absorbent material to be added to the grease trap. In certain aspects, the above method further includes after step (c), repeating steps (a)-(c) until a desired amount of fats, oils, and/or grease has been absorbed and removed from the grease trap or until all fats, oils, and/or grease. In certain aspects, the above method further includes after step (b), repeating steps (a) and (b) until a desired amount of fats, oils, and/or grease has been absorbed by the absorbent material in the grease trap or until all fats, oils, and/or grease has been absorbed by the absorbent material. In certain aspects, the above method further includes pumping air by a positive pressure pump into the mixture of water, fats, oil, and grease to increase absorption, coagulation, and/or flocculation of the absorbent material during steps (a) and (b) and to aid and facilitate removing the biofuel from the grease trap during step (c) by maintaining the biofuel on an uppermost surface of the separated water that remains in the grease trap.

DETAILED DESCRIPTION OF THE PREFERRED EMBODIMENTS

Figure 1:
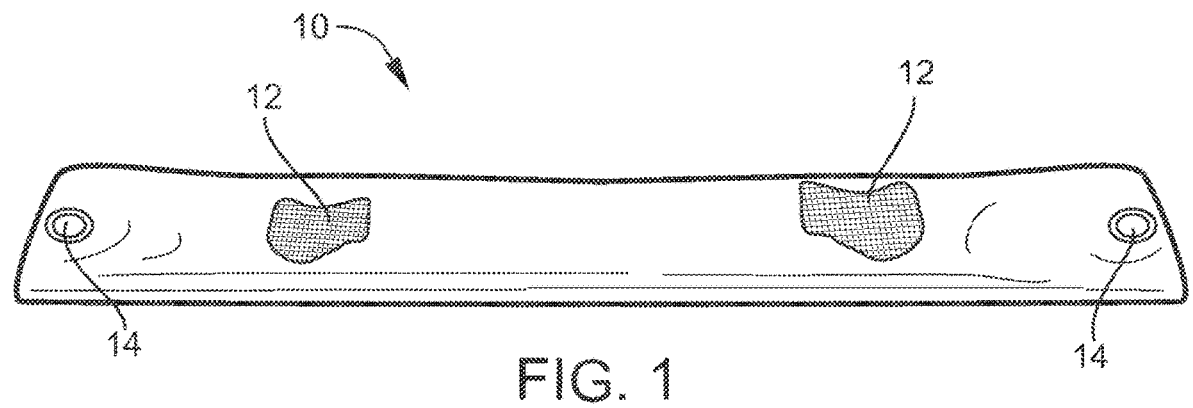
FIG. 1 is a perspective view of the geotextile container in tube form according to an embodiment of the invention.
Figure 2:
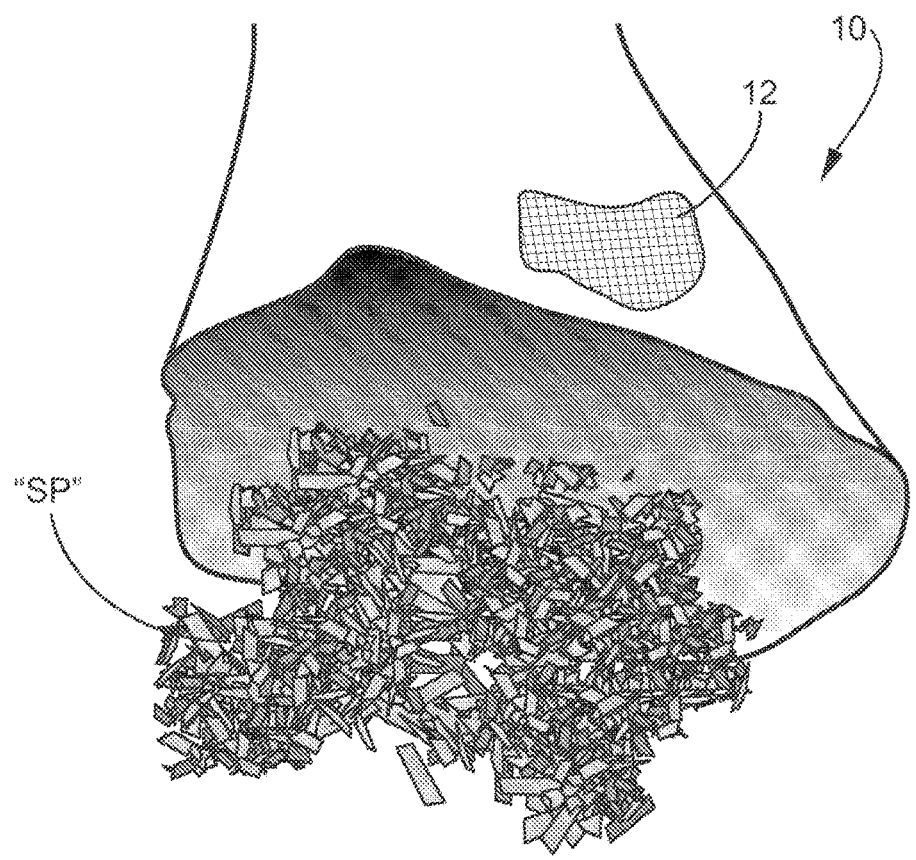
FIG. 2 is a fragmentary, enlarged end view of the tube of FIG. 1, shown in an open positon for receiving a quantity of sphagnum peat material, mushroom compost, orange peels, polypropylene or other absorbent material.

Referring now to the drawings, a container in the form of a tube 10 for use in the present invention is shown in the FIGS. 1-2, as noted. The tube 10 may be constructed according to many suitable constructions, but one construction comprises an elongate tube 10 that is formed of a geotextile fabric 12 that may be constructed by circular knitting, flat knitting, weaving, non-woven formation or any other fabric construction having a multitude of openings through the thickness of the fabric 12. The fabric 12 is preferably seamed along its length to form the tube 10. The tube 10 may be constructed of a synthetic, biodegradable or natural material. The fabric 12 of the tube 10 may be constructed of any suitable natural or biodegradable/synthetic yarn, for example, with a natural fiber such as cotton, hemp, ramie, jute or similar material because of its biodegradable characteristics, with apparent opening size (AOS) on the order of 0.25 to 0.5 mm depending on the size of the sphagnum peat or mushroom compost absorbent material. The empty tube 10 may be any suitable length and diameter, for example, 60 cm to 120 cm long and 7 cm to 15 cm in diameter depending on the size of the grease trap and the FOG loading from the restaurant or auto repair facility. As manufactured, the tube 10 is preferably closed at one end and filled from the opposite, open end. The open end of the filled tube 10 may be closed with any suitable closure, such as stitching, clips or tied off with cord at the top of the grease trap or other FOG separating and collection structure.

Figure 5:
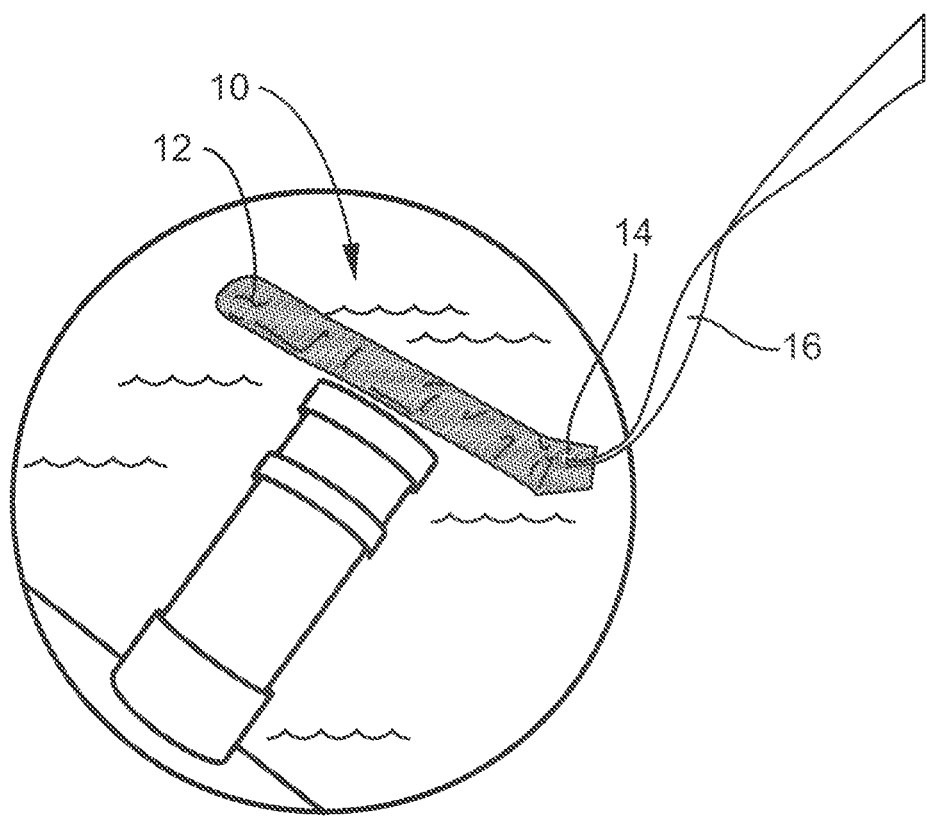
FIG. 5 is an illustration of a typical restaurant grease trap showing placement and use of the geotextile tube to absorb FOG.

The tube 10 may include an opening 14 on either or both ends to receive a cord 16, as shown in FIG. 5, by which the tube 10 may be lowered into and retrieved from a grease trap or other enclosure and tethered to the grease trap or other structure while in use.

One or more coatings may be applied to the fabric 12 to prevent penetration of the fabric 12 surface by water or aqueous salts thereby allowing the fabric 12 substrate to be non-absorbent for water or soluble salts.

Figure 3:
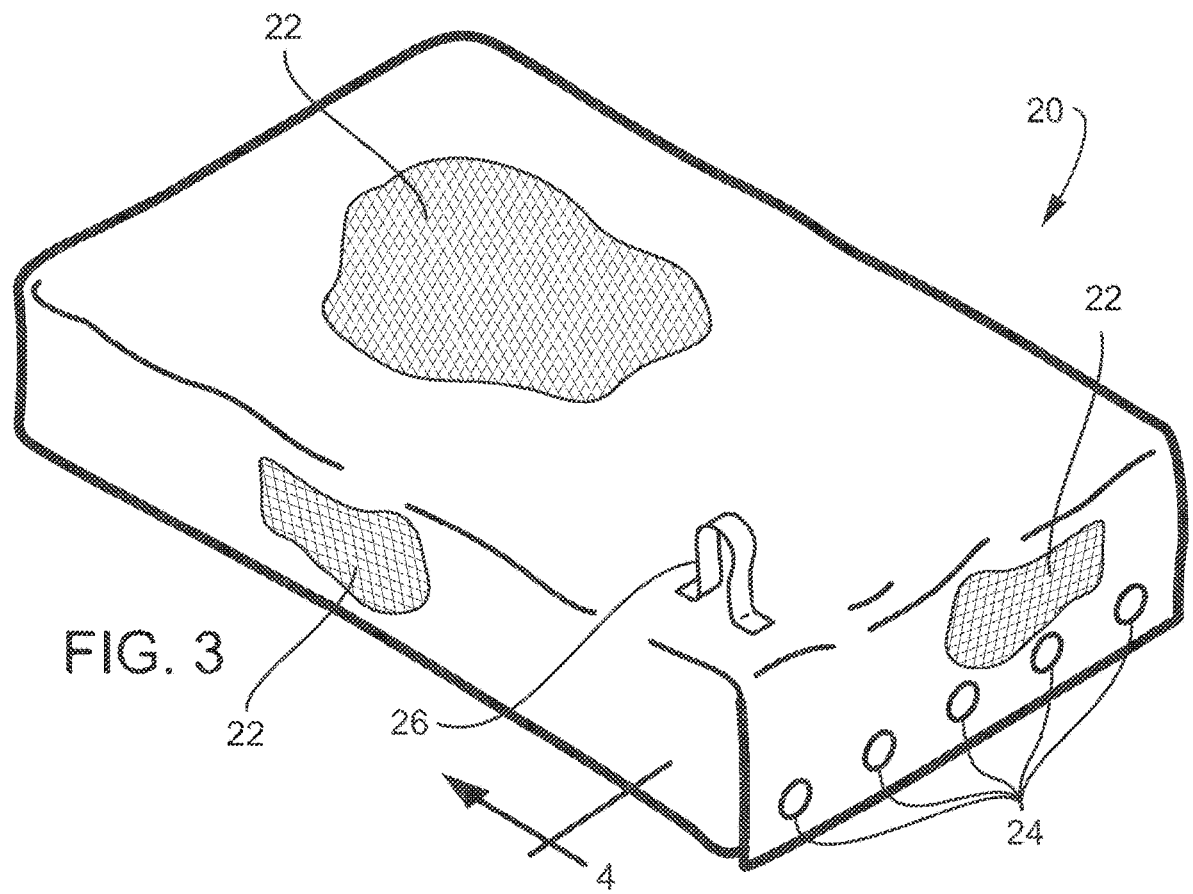
FIG. 3 is a perspective view of a geotextile container in mat form according to an embodiment of the invention.
Figure 4:
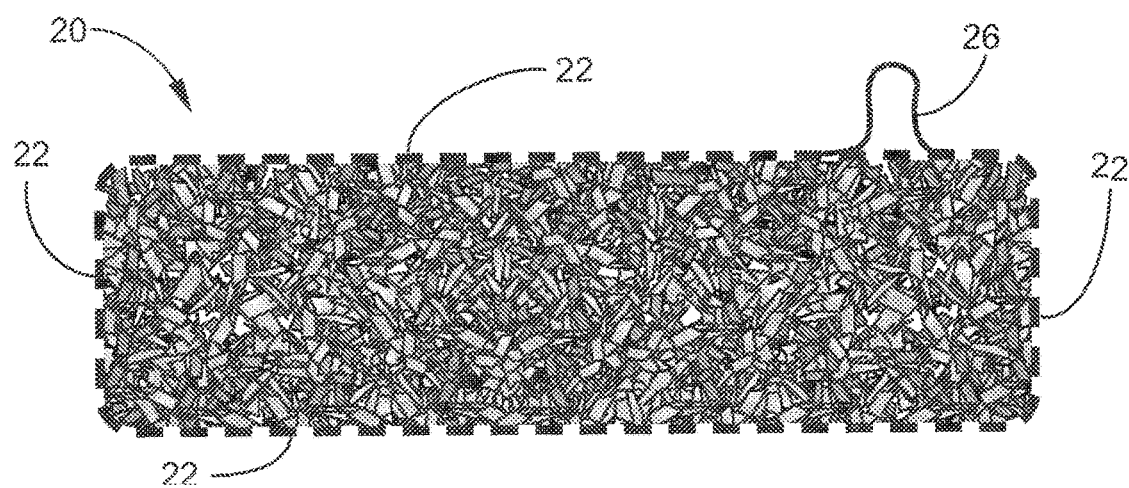
FIG. 4 is a vertical cross-section of the geotextile mat with sphagnum peat material or other absorbent material contained in the mat.

Referring now to FIGS. 3 and 4, a container in the form of a mat 20 for use in the present invention is shown in the FIGS. 3-4, as noted. The mat 20 may be constructed according to many suitable constructions, but one construction comprises a rectangular "box" shape that is formed of a geotextile fabric 22 that may be constructed by circular knitting, flat knitting, weaving, non-woven formation or any other fabric construction having a multitude of openings through the thickness of the fabric 22. The fabric 22 is preferably seamed along its length and width to form the mat 20. The mat 20 may be constructed of a synthetic, biodegradable or natural material. The fabric 22 of the mat 20 may be constructed of any suitable natural or biodegradable/synthetic yarn, for example, a natural fiber such as cotton, hemp, ramie, jute or similar material because of its biodegradable characteristics, with apparent opening size (AOS) on the order of 0.25 to 0.5 mm depending on the size of the sphagnum peat or mushroom compost absorbent material. The empty mat 20 may be any suitable length, width and height, for example, 60 cm to 120 cm long, 30 cm to 60 cm long and 10 cm to 20 cm in height depending on the size of the grease trap and the FOG loading from the restaurant or auto repair facility. As manufactured, the mat 20 is preferably closed at one end and filled from the opposite, open end. The open end of the filled mat 20 may be closed with any suitable closure, such as stitching, clips, or snaps 24. The mat 20 may be seamed in such manner as to create individual compartments within the mat 20.

The mat 20 may include a loop 26 to receive a cord by which the mat 20 may be lowered into and retrieved from a grease trap or other enclosure and tethered to the grease trap or other structure while in use.

One or more coatings may be applied to the fabric 22 to prevent penetration of the fabric 22 surface by water or aqueous salts thereby allowing the fabric 22 substrate to be non-absorbent for water or soluble salts.

The preferable FOG absorbent material filled into the mat 20 is a specialized form of sphagnum peat "SP" or mushroom compost materials.

FIG. 5 illustrates placement of a tube 10 proximate an entrance to a grease trap, and tethering the tube 10 with the cord 16 as described above to remain proximate to the grease trap entrance.

Figure 6:
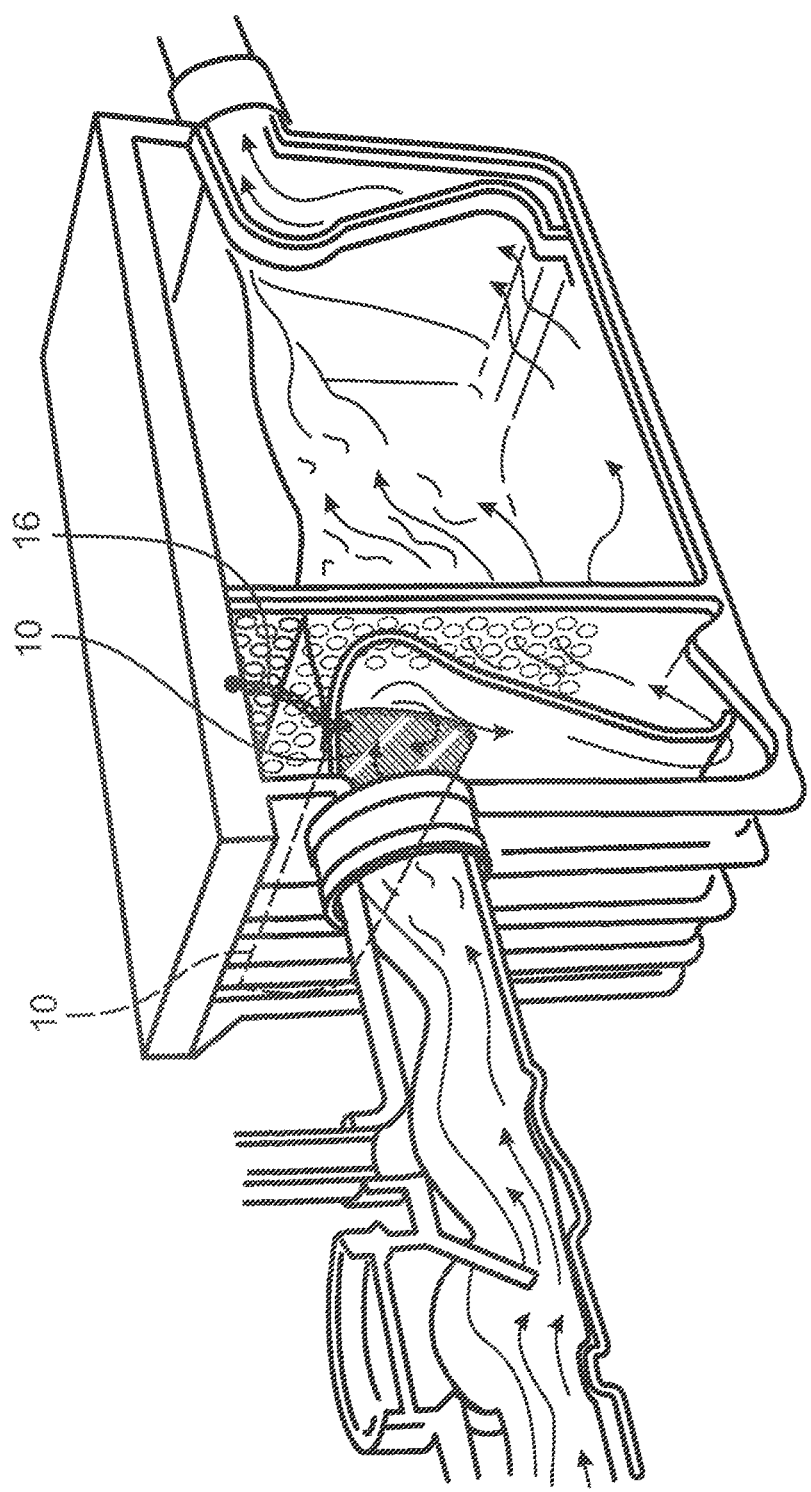
FIG. 6 is a cross-sectional view that shows the location of the absorbent mat in a cross section of a typical grease trap at a restaurant or auto maintenance facility.

FIG. 6 illustrates placement of the tube 10 in a grease trap relative to other components of a conventional grease trap structure.

The following step by step process is expected for typical use and implementation of the FOG product and collection process. The process is explained with reference to the tube 10, but will be essentially the same when using the mat 20.

STEP 1: Introduce the tube 10 with selected sphagnum peat "SP" or mushroom compost into the grease trap or other FOG collection structure. Tether the tube 10 with cord 16 so that it stays at the influent end of the grease trap, and is the optimal location of FOG collection. Prior to placement in the grease trap, weigh the dry tube 10 so that a 'before and after" measure of FOG collection can be established.

STEP 2: After consultation with local water and sewer regulatory officials and the owner of the FOG collection device or grease trap, setup of a regular interval to remove and replace the FOG collection absorbent tube 10. From past experience, the best way to initiate the use of the FOG remediation technology is to start off as a regulatory approved Demonstration Project where the approach and results are measured and evaluated.

STEP 3: Depending on the interval for removal and collection of the FOG absorbent tube 10, arrange for storage in covered and secured FOG containers to avoid attracting small animals and rodents that are common in and around restaurants and auto repair facilities.

STEP 4: Transport and dispose of the FOG absorbent tube 10, mat 20 or other suitable container to a regulated, Subtitle D lined disposal facility, or to a sewage sludge incinerator (SSI). If disposed of at an SSI facility, the FOG tube 10 is then part of waste to energy, renewable energy fuel source.

The advantage of the FOG process using the tube 10 or mat 20 is that it safely and cost effectively separates FOG in the grease trap before it is mixed with large volumes of water and emulsified waste liquids. Separation after the fact is difficult and expensive.

The FOG absorbent tube 10 works for FOG collection because the sphagnum peat "SP" or mushroom compost materials are highly absorbent natural materials that separate the FOG from liquids or water. The absorbing characteristics are a combination of increased surface area and natural filtering processes, similar to that provided by charcoal or activated carbon. A slightly larger AOS in the filtering geotextile fabric 12 will allow more of the natural absorbing and geochemical attraction between the sphagnum peat "SP" to have better contact with the surface FOG materials to attract and collect it from the liquids/water. This approach reduces the tendency or emulsification of the FOG into the grease trap so that frequency of the grease trap pumping and remixing of the FOG and water/liquid will be reduced. Collecting the FOG from the surface of the grease trap is much more efficient and cost effective.

Collecting the FOG from the surface of grease traps substantially reduces the volume of mixed FOG and liquids that are the cause of significant maintenance problems in sewer systems, and the cause of difficult to apply sludge materials that are typically utilized on farmland. FOG offer little or no benefit for improving macro and micro nutrients on farmland because it is resistant to biodegradation and has little or no nitrogen, phosphorus, and potassium (i.e. PKN). See Use of Peat in the Treatment of Oily Waters, G. N. Mathavan & T. Viraraghavan, 1989.

Estimate of the absorbing qualities of peat moss appear to be the range of 5 to 10 $kg/m^2$ per FOG tube 10 per week. This will be an area of applied research and measurement during future demonstration projects.

Polar molecules have a positive charge on one end and a negative charge on the other end. Non-polar molecules do not have two electrical poles and the electrons are distributed symmetrically on both sides. FOG is composed of organic non-polar compounds. Water is a polar solvent. Only polar compounds or other polar solvents will mix with water. Therefore, non-polar FOG will not readily mix with water. Depending on the source, FOG has a density of approximately 0.863-0.926 $g/cm^3$. Water has a density of approximately 1.000 $g/cm^3$. The lesser density will float on top of the greater density substance if it does not mix, thus non-polar FOG floats on water because it does not mix and gravity exerts more pull on the greater density water molecules. Water molecules are relatively small because they are only composed of one oxygen and two hydrogen molecules ($H_2O$). They therefore pack closely together in a space. Molecules of oil are large and have complicated shapes, thus requiring more space than water molecules. This is why oil is less dense than water.

A few oils having densities less than water are known to be polar compounds and can mix with water and therefore not float on the water's surface.

Thus, polarity and density both contribute to oil floating on water.

Polarity is a relative term. On a sliding scale, some oils are more or less polar than others are and have both polar and non-polar attributions Also, the heating of oils and interaction with other organic compounds it is exposed to during heating, can change the oil's chemical composition, and thus change the relative polarity.

The above referenced principles permit the method of this application to work as intended and as developed.

Further evidence supporting the "charge" principle is found at Fats, Oil and Grease Science, Dothan, Alabama. Fats, Oils, and Grease (FOG) Science https://www.dothan.org/DocumentCenterNiew/3032/FOG---Science?bidId=

Figure 7:
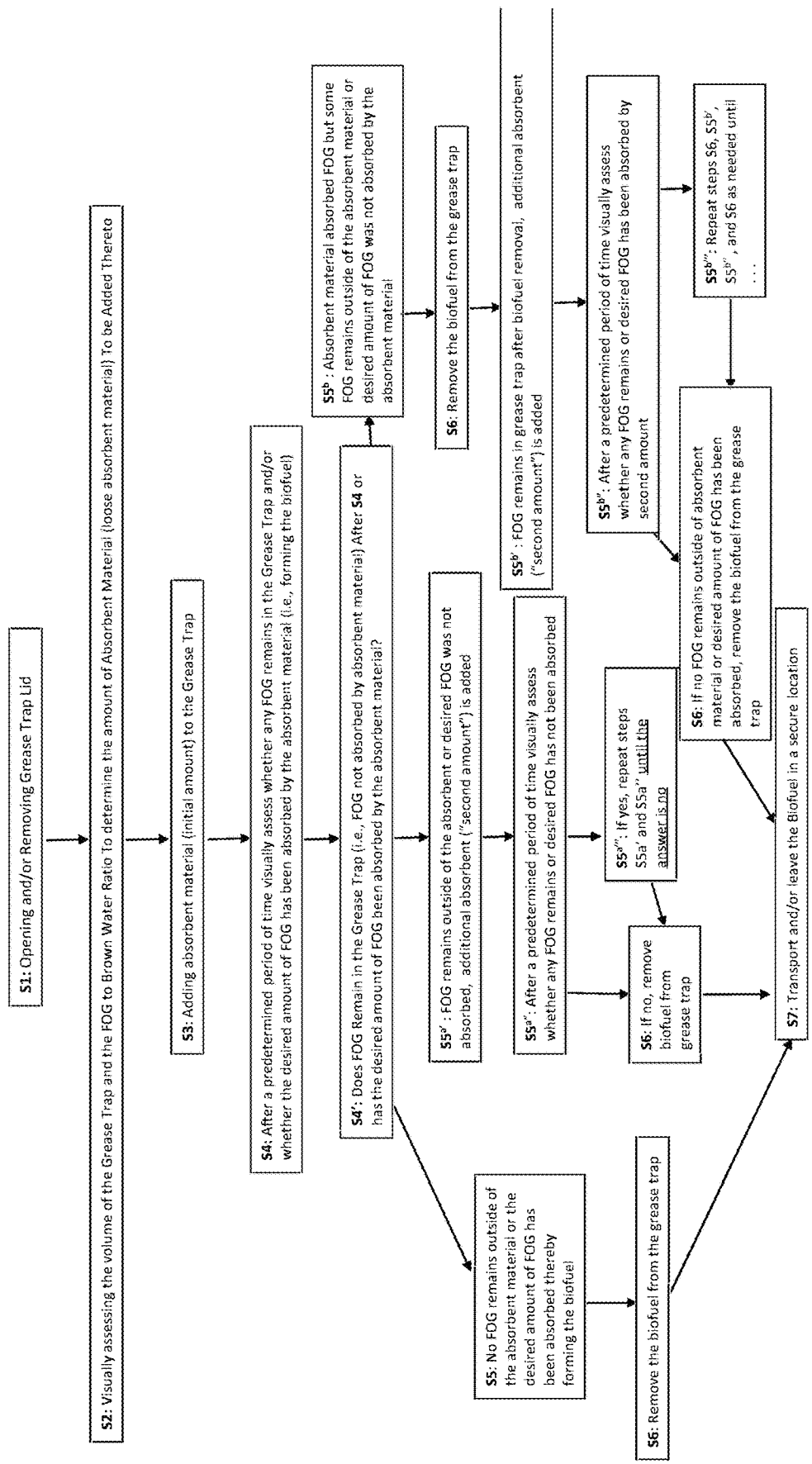
FIG. 7 schematically depicts an alternative method of the biofuel formation/production and removal from, for example, a grease trap using the disclosed absorbent material(s)

As further shown in FIG. 7 and in additional aspects, the FOG absorbent material may be used alone (i.e., excluding the previously mentioned container that contains the absorbent material and/or the absorbent material separated from the container) to absorb FOG when forming/producing the biofuel product (i.e., the absorbent material having FOG absorbed therein). When used in this manner, a user (e.g., technician) places a desired, predetermined amount of absorbent material within, for example, a grease trap (or other container having FOG therein). The user then allows an adequate time for the absorbent material to absorb and preferably become saturated with FOG thereby forming the biofuel product. Subsequently the user removes the biofuel product from, for example, the grease trap for subsequent use and/or processing steps to be used as the biofuel product. During the removal step of the biofuel product (i.e., absorbent material having FOG absorbed therein) in the above mentioned process, it is further envisioned that a positive pressure pump (e.g., a modified pool pump such as the Pentair line of pool pumps) and other removal aids (e.g., a net, filter, etc.) will be used to further expedite the overall process to remove the biofuel from the grease trap in an expeditious and efficient manner.

More specifically in the above-mentioned method and in view of FIG. 7, the technician arrives at the grease trap to be serviced and removes/opens the grease trap's lid (S1). Next, the amount of absorbent material to be introduced into the grease trap will be determined by the technician visually inspecting and assessing the overall volume of the grease trap along with the ratio of FOG to brown water contained therein (S2). The technician next introduces a sufficient amount of the loose absorbent material (e.g., 1 pound, 5 pounds, 10 pounds, 20 pounds, etc.—termed the "first amount" or "initial amount") into the trap (S3) to allow for the desirable amount of absorption of FOG into the absorbent material. For example, each pound of absorbent material should absorb between 5 pounds to 9 pounds of FOG per pound of absorbent material, and in preferred aspects, each pound of absorbent material should absorb between 7 pounds to 8 pounds of FOG per pound of absorbent material. In preferable aspects, the desirable amount of FOG absorption of FOG into the absorbent material is 5%, 10%, 20%, 30%, 40%, 50%, 60%, 70%, 80%, 90%, 95%, 98%, or 100% of the FOG within the grease trap, and in certain aspects the percentage removal of FOG complies with local laws and ordinances, state laws and ordinances as well as any applicable Federal laws.

After a predetermined time period in which absorption of FOG into the absorbent material has occurred (S4), the grease trap is again visually inspected and assessed to further determine whether any FOG remains (S4'), and if so, to further determine the ratio of FOG to brown water remaining in the grease trap. At that time, more absorbent material (a "second amount" of absorbent material) may be added ($S5^{a'}$) to absorb the remaining FOG (i.e., FOG that was not absorbed by the previously provided absorbent material in (S3)). After a predetermined time period ($S5^{a''}$), the technician again visually assesses whether any FOG remains in the grease trap (outside of the biofuel) or whether the desired amount of FOG has not been absorbed. If the answer to (S5$^{a\prime\prime\prime}$) is no, the biofuel is removed from the grease trap (S6) by the removal process discussed further below and subsequently stored (S7).

However, if the answer to (S5$^{a\prime\prime\prime}$) is yes, subsequent amounts of absorbent material (e.g., "third amount", "fourth amount", "fifth amount", etc.) may be added (S5$^{a\prime\prime\prime\prime}$), by the technician until the desirable amount of FOG absorption (and desired FOG to brown water ratio) has been reached. After reaching the desired FOG absorption amount in the absorbent material (and the desired FOG to brown water ratio), the absorbent material having FOG absorbed therein (biofuel) may be subsequently removed (S6) all at once by the removal step/process discussed further below.

As an alternative to the above, an absorbing step followed by an immediate removal step may be used. In this aspect, the absorbent material (S3) (i.e., first amount or initial amount) is added to the grease trap and after a predetermined time period (S4) FOG is absorbed into the absorbent material forming the biofuel. If no FOG remains outside of the absorbent material or the desired amount of FOG has been absorbed thereby forming the biofuel (S5), the biofuel (S6) (i.e., first amount of absorbent material having FOG absorbed therein) is removed from the grease trap and the process is concluded by subsequently storing (S7) the biofuel.

However, in certain alternative aspects and after steps (S4) and (S4'), it may be determined that the absorbent material has absorbed FOG but some FOG remains outside of the absorbent material or the desired amount of FOG was not absorbed (S5$^{b}$) by the absorbent material. (S6) removal of the absorbent material having FOG absorbed therein (i.e., biofuel) from the grease trap may immediately occur after (S5$^{b}$), and the technician may again visually inspect and assess the grease trap to determine whether any additional FOG remains therein. If so, the technician may again, introduce (S5$^{b\prime}$) the absorbent material ("second amount" of absorbent material) and allow for absorption of FOG into the second amount of absorbent material (biofuel) (S5$^{b\prime\prime}$). If no FOG remains outside of absorbent material or desired amount of FOG has been absorbed, the biofuel is removed from the grease trap (S6). However, after (S5$^{b\prime\prime}$) if FOG remains outside of absorbent material or desired amount of FOG has not been absorbed, (S5$^{b\prime\prime\prime}$) occurs in which (S6), (S5$^{b\prime}$), (S5$^{b\prime\prime}$), and (S6) are repeated until no FOG remains outside of the absorbent material or the desired amount of FOG has been absorbed (e.g., almost all FOG has been absorbed), the biofuel from the grease trap and subsequently store (S7).

To further aid in the removing/removal steps (i.e., removing the biofuel comprising the absorbent material having FOG absorbed therein), additional removal tools and aids may be used. For example, the technician may use a rake or rake-like device to actuate the absorbent material, FOG, and/or brown water in the grease trap and to spread the absorbent material more evenly on the surface of the FOG/water mixture within the grease trap. This step advantageously increases the rate of absorption into the absorbent material and further expedites the FOG capture and removal process from the grease trap. During this step, the absorbent material having FOG absorbed therein is hydrophobic and will continue to float even when saturated with FOG.

At this point, the technician may further utilize a positive pressure pump (a modified pool pump such as the Pentair line of pool pumps) to pump the biofuel (i.e., FOG laden absorbent material) from the top, or uppermost, portion of the grease trap and to remove the biofuel therefrom via a filter and/or physically removal (e.g., via a net or another similar removal device). During the removal process and while using the pump, the pump will beneficially circulate the brown water back into the grease trap thereby keeping the grease trap maximally efficient and effective. The maximum efficiency of the grease trap is achieved by keeping the grease trap full of water during the removal process.

While pumping the FOG. laden absorbent material out of the grease trap, the technician moves the end of the hose around the top and/or uppermost sections of the grease trap surface until all of the biofuel (i.e., absorbent material having FOG absorbed therein) has been removed from the grease trap.

After the biofuel (i.e., absorbent material laden with FOG and/or absorbent material having FOG absorbed therein) has been captured and removed from the grease trap and the unencumbered water drained from the positive pressure pump hoses into the grease trap, the grease trap lid is closed securely. Then the technician either transports the biofuel to another location, or leaves the biofuel in a secure area for subsequent removal and processing.

An apparatus and method for collection and disposal of fats, oil and grease according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

Figure 8:
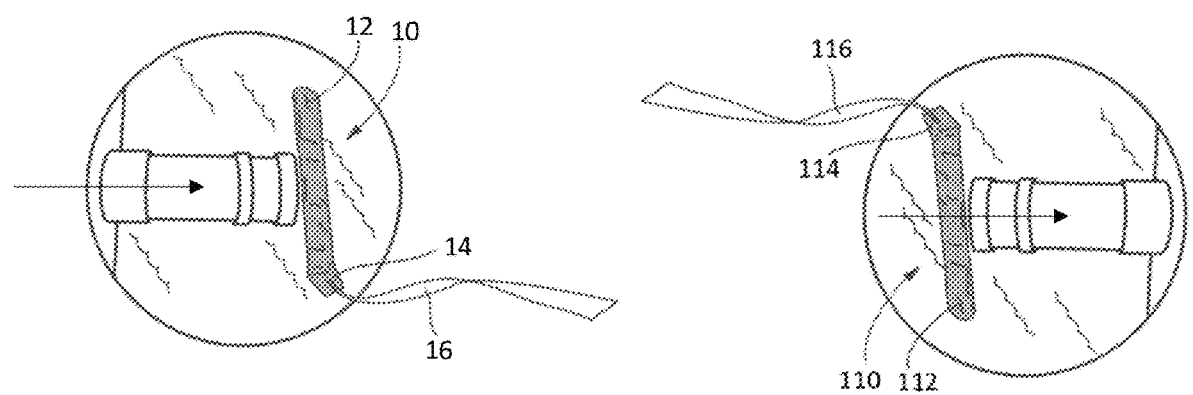
FIG. 8 depicts an alternate embodiment of a conventional restaurant grease trap showing placement and use of a first geotextile tube and a second geotextile tube to absorb FOG.

In various embodiments, one or more tubes or other FOG capture or filtering devices may be used simultaneously to ensure that any residual FOG that passes through and not absorbed by the first tube 10, is ultimately captured prior to exiting the grease trap or interceptor/collector device and entering into any sewer line or other POTW. The arrows in FIG. 8 depict the direction of the flow of water through the inlet, past the first tube 10, into the grease trap, then through the second tube 110 to the exit pipe 120. In example embodiments, as shown in FIG. 8, a second FOG capture and/or filtering device 110, being substantially the same and/or generally a mirror image of the first tube 10 may be affixed to the grease trap by a cord or tether 116 similar to the first tube. In alternate embodiments, the FOG capture device 110 may be filled with any suitable aggregated absorbent material, as discussed above. In particular embodiments, the FOG device 110 may envelope or encase an exit or outlet of the grease trap, thereby preventing additional or residual FOG from entering the POTW. In certain embodiments, the FOG device 110 may be friction fit or otherwise removably coupled to the interceptor outlet with any suitable fastening mechanism. For example, a cap or other containment device may be filled with absorbent material and then stretched or fit around the outlet 118 of the grease trap that captures any remaining FOG and prevents any remaining FOG from escaping the grease trap while still allowing water to pass through, as discussed in detail above. In various embodiments, the cap or second FOG device 110 may be made of any suitable absorbent material having oleophilic and hydrophobic properties that are ideal to absorb fat, oil, and/or grease while repelling and/or filtering out water from, for example, a mixture of water, fats, oils, and greases. As discussed above, the absorbent material includes, but is not limited to, sphagnum peat, mushroom compost, and orange peels and/or a polyolefinic material and more preferably a polypropylene.

In various embodiments, the FOG device 110 is encased within the outlet 118 or exit pipe 120 of the grease trap. For example, the outlet 118 may include an opening or other selectively closeable aperture for inserting and removing the FOG device 110. As is understood in the art, the outlet 118 and/or exit pipe 120 includes a hollow interior and rounded outer surface. In various embodiments, any suitable pipe may be used to assist with the flow of water out of the grease trap and to the sewer system. In an example embodiment, the exit pipe 120 includes an access point 102 such as a hinged door for accessing and replacing the FOG device 110 once it has captured its full capacity of residual FOG For example, the hinged door may be a self-closing hinged door coupled to the exit or exposed pipe leading to the sewer. A self-closing hinge is preferred as it will ensure the sewer pipe is not open and exposing the surrounding area to any potential harmful effects. In particular embodiments, the hinged door may include a flange, such as a non-corrosive metal flange, that is approximately 10-12 inches long and approximately 1 inch wide. Preferably, the flange is constructed of stainless steel. Given the nature of this invention, it is suggested that the opening and the hinged door be installed by a certified plumber to reduce the risk of spillage or other damage.

In alternate embodiments, the hinged door may be a pivoting door or may be entirely removable from the exit pipe 120. In particular embodiments, the hinged door may include a flange such as a non-corrosive metal flange that may be used to hold the FOG device 110 in place. For example, the hinged door may include a connection point for the tether 116 or the metal flange itself may be used to hold the FOG capture device 110 in place such that it is continuously positioned in front of the outlet 118 necessitating thereby the flow of FOG laden water through the capture device. By doing this, and because the FOG capture device 110 is hydrophobic, water will easily pass through the FOG device while simultaneously capturing any residual FOG material, thereby ensuring a more complete capture of FOG before the water leaves the interceptor/grease trap device and enters the sewer system. In some embodiments, the access point may be located at a wall or other surface if the outlet 118 and/or exit pipe 120 is flush with the wall/surface. It will be understood to one having ordinary skill in the art that the opening or aperture may be any suitable size configured to access the FOG device 110 for placement and removal.

In various embodiments, the access point or hinged door 102 may be formed of a non-corrosive metal such as stainless steel to prevent rust or other corrosion, thereby preventing frequent replacement and repair. In particular embodiments, the access point or hinged door 102 may be affixed to the exit or sewer pipe by a certified plumber. For embodiments including a hinged door 102, a second tube or capture device 110 may be positioned in, and contained in a stationary manner such that it covers the complete surface area of the outlet, thereby catching and containing any remaining FOG Thus, any water and other substance leaving the grease trap by way of the outlet 118 to the exit pipe 120 will flow through the second FOG device 110. In various embodiments, the FOG device 100 may be releasably coupled to the access point 102, similar to the first tube 10, such that, once filled, it may be removed for incineration and/or for future processing as a biofuel.

In a particular embodiment, the FOG containment or capture device 110 may include a second tube 110 or second mat, similar to the first tube 10 and mat 20 referenced above. In some embodiments, the FOG containment device 110 is affixed to an exposed pipe leading to the POTW. In alternate embodiments, when the sewer pipe is flush with a wall or other surface, the FOG containment device 110 may be affixed to the wall or surface itself. For example, the FOG device 100 may include a hinged door permanently or semi-permanently affixed to the sewer pipe or other exit means from the grease trap.

Figure 9:
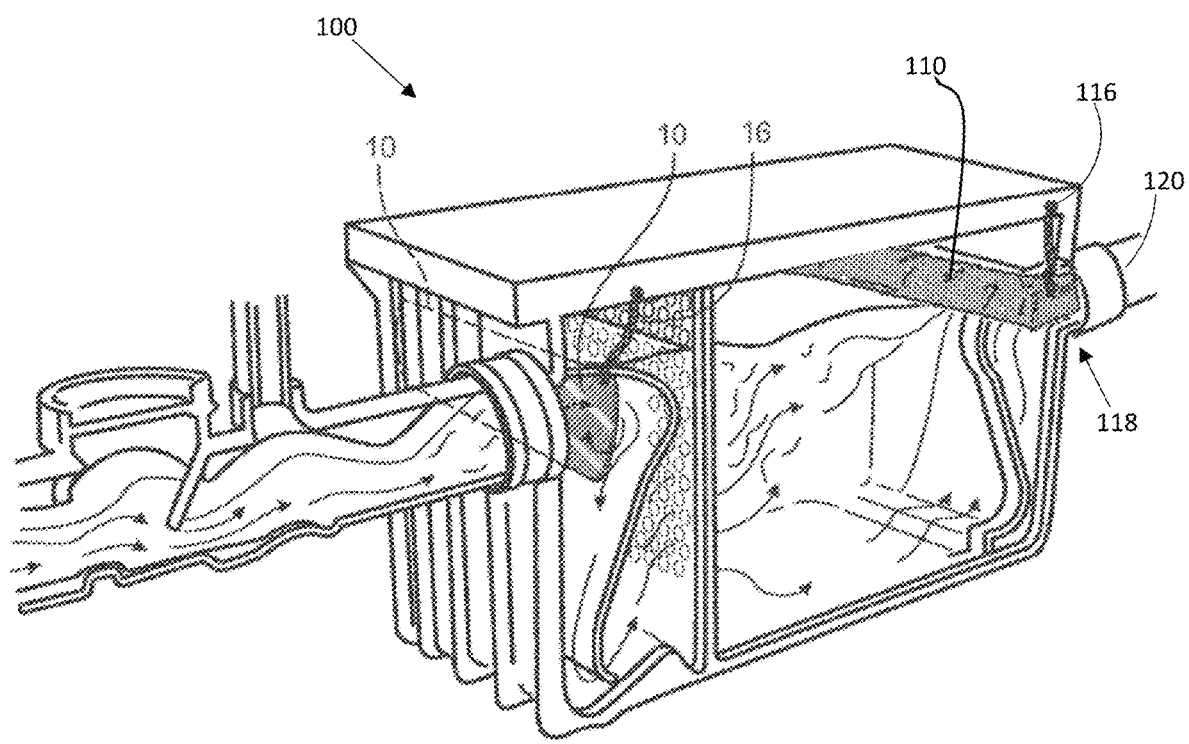
FIG. 9 is a cross-sectional view of the alternate embodiment of FIG. 8 that shows the location of a first and a second absorbent mat in a cross section of a conventional grease trap.

FIGS. 8 and 9 illustrate placement of the second tube 110 in a grease trap relative to the first tube 10 and the other components of a conventional grease trap structure, according to a particular embodiment. In various embodiments, the first tube 10 is placed proximate an entrance or inlet of a grease trap and tethered with the cord 16 as described above to position the first tube 10 proximate to the grease trap entrance/inlet, similar to that shown in FIG. 5. At the opposing end of the grease trap, proximate an exit/outlet, a second tube or FOG containment device 110 is tethered with a cord 116, similar to the first tube 10. In example embodiments, the second tube 110 is substantially similar to the first tube 10, as described above. For example, the second tube 110 may also include an opening 114 on either or both ends to receive a cord 116, as shown in FIG. 8, by which the second tube 110 may be lowered into and retrieved from a grease trap or other enclosure and tethered to the grease trap or other structure while in use. Thus, for purposes of ease of understanding and clarity, only certain features will be discussed to highlight the differences in the systems and methods of the embodiment shown in FIGS. 1-7 as compared to the embodiment(s) shown in FIGS. 8-10.

Figure 10:
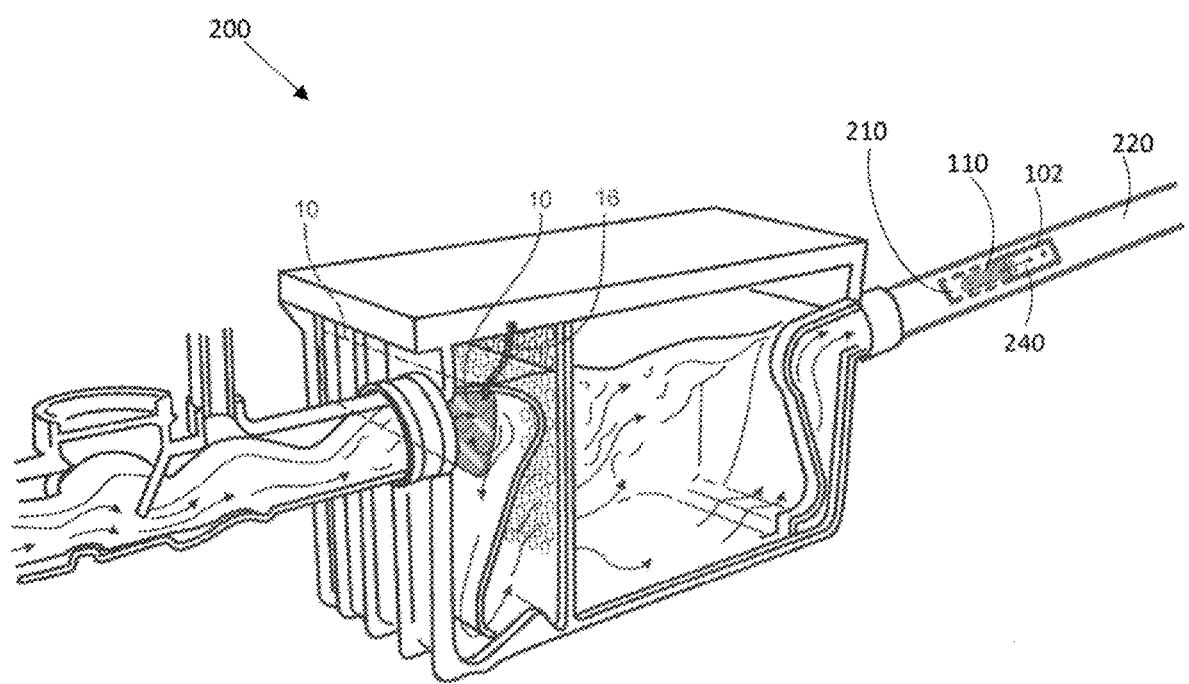
FIG. 10 is a cross-sectional view of an alternate embodiment of a conventional grease trap having one or more FOG capturing devices.
Figure 11:
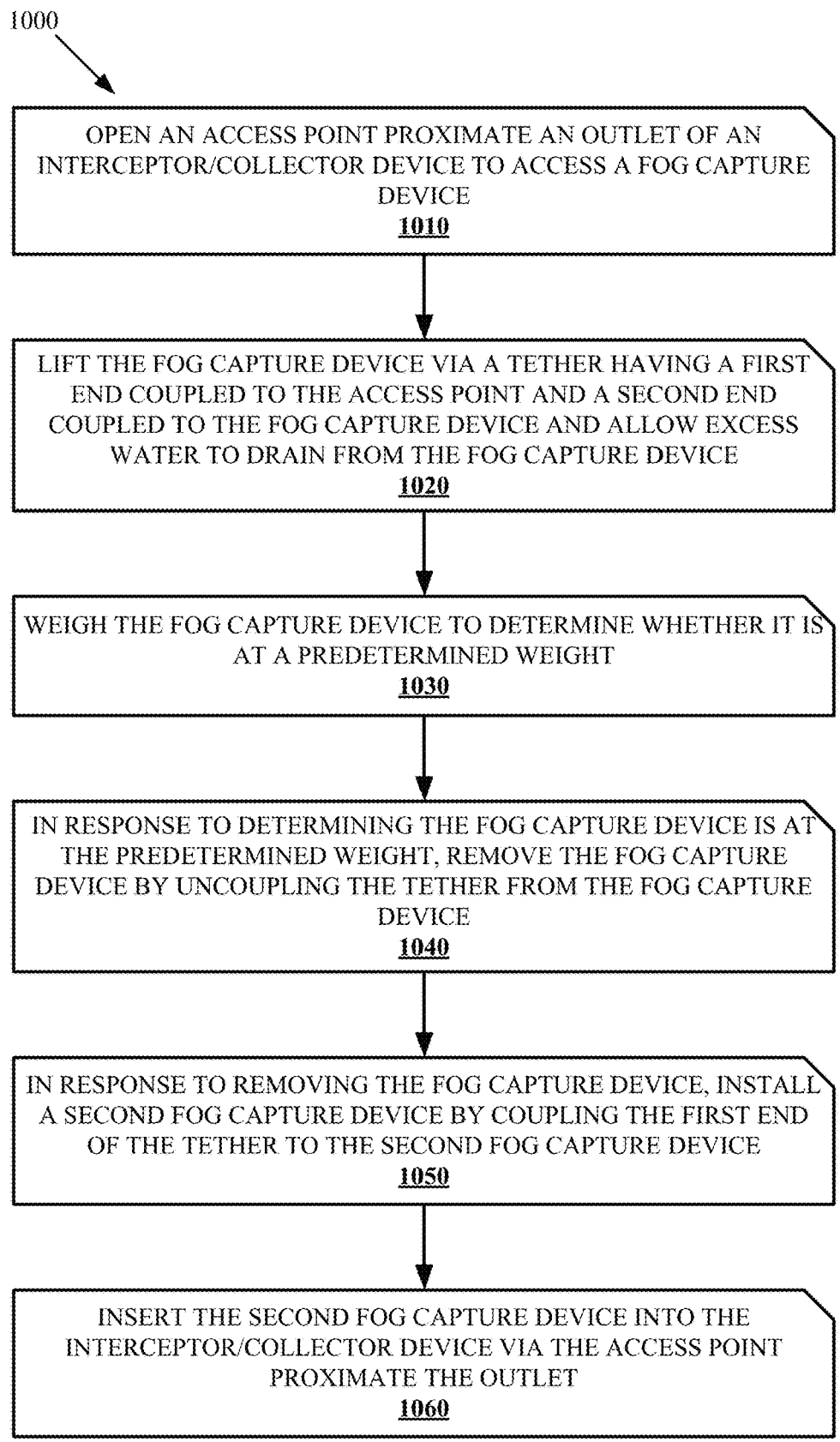
FIG. 11 schematically depicts an alternative method of biofuel formation/production and removal from, for example, a grease trap using the disclosed absorbent material(s) from FIGS. 8-10.

FIG. 10 illustrates an alternate embodiment 200 having an aperture 210 exposing the interior of the exit pipe 220 with a hinged door 102 that may be selectively opened or closed to access the interior of the pipe. The FOG capture device 110 may be inserted into the pipe 220 and positioned in a contained and stationary manner to cover the complete surface area of the water flowing into the exit pipe 220 that leads to the sewer lines. The FOG capture device 110 is positioned such that all water and other matter flowing through the outlet and into the exit pipe 220 will have to flow through the FOG capture device, creating a second filtering function. The FOG capture device 110 may be held in place by the hinged door or access point 102 and/or the flange (not shown or numbered) trapping the FOG capture device when the hinged door is closed. In an alternate embodiment, a tether 240 may be used to assist with holding the second tube 110 in place while the access point is closed to further prevent movement of the second tube 110.

In an alternate embodiment, the following step by step process make take place prior to, simultaneously with, or after STEPS 1-4 have occurred and/or before/after/concurrently with any of the steps described with reference to FIG. 7. The following steps are expected for typical use and implementation of the FOG product 110 and collection process when a first tube 10 and a second tube are used. The process is explained with reference to the first 10 and second tube 110, but will be essentially the same when using the mat 20, discussed above.

STEP 1A: Introduce the second tube 110 with absorbent material selected sphagnum peat "SP", mushroom compost, orange peels, and/or polyolefinic materials therein proximate the outlet of the grease trap or other FOG collection structure. As discussed, the second tube 110 may be inserted into the grease trap in front of the outlet 118 or in the exit pipe 120 itself. The second tube is then either tethered to the access point or held in place by the flange to maintain its position at the outlet end of the grease trap, and is the optimal location of any residual FOG collection. The second tube 110 should be weighed while dry prior to its placement so that a 'before and after' measure of FOG collection can be established.

STEP 2: After consultation with local water and sewer regulatory officials and the owner of the FOG collection device or grease trap, services should be regularly scheduled to remove and replace the first tube 10 and the second tube 110. From past experience, the best way to initiate the use of the FOG remediation technology is to start off as a regulatory approved Demonstration Project where the approach and results are measured and evaluated. These capture devices 10, 110 should be serviced on a regular basis as determined by the need once completed demonstration projects determine the frequency for the need of servicing. For example, demonstration projects and service worker's experience may guide the change of this filtering device every second or third visit to the grease trap. Because the FOG capture device 110 may be connected to a tether, once the self-closing hinge is opened, the tethered capture device can be pulled out of the grease trap, and measured for weight. Such weight measurement should be done continually so that it becomes a guide to the frequency of replacement of the absorption device needed.

STEP 3: Depending on the interval for removal and collection of the FOG capture device 110, arrangements for storage in covered and secured FOG containers should be made to avoid attracting small animals and rodents that are common in and around restaurants and auto repair facilities because of their affinity for the FOG.

STEP 4: When transporting and disposing of the tube 10 or mat 20, the FOG capture device 110 should also be transported and disposed of with a suitable container to a regulated, Subtitle D lined disposal facility, or to a sewage sludge incinerator (SSI). If disposed of at an SSI facility, the FOG capture devices are then part of waste to energy, becoming a renewable energy fuel source.

An exemplary method of using and replacing the second FOG capture device 110 is disclosed in FIG. 10. At step 1010, a user may open an access point proximate an outlet of an interceptor/collector device to access a fog capture device. Once the self-closing hinge is closed over the containment device, it can be opened and closed from the ground above the opened grease trap with, for example, a six (6) foot pole. In some embodiments, the pole may include triangular flat metal or stainless steel band that has been permanently affixed to one end of the pole. With this device, a user or service technician can easily reach into the trap and flip open the self-closing hinge.

At step 1020, a user may lift the FOG capture device 110 from the trap (or pipe, depending upon where the access point is located) via a tether having a first end coupled to the access point and a second end coupled to the FOG capture device. Once lifted, a user may drain the FOG capture device 110 over the trap for a period of time (e.g., 30-60 seconds) so that any excess water on the surface of the FOG capture device 110 is released back into the trap.

At step 1030, the user may then weigh the FOG capture device 110 to determine whether it is at a predetermined weight. Through regular use and measurement of the FOG capture device 110, a user will be able to gain guidance on the frequency of when the FOG capture device needs to be removed and replaced. In particular instances where the removed FOG capture device 110 is considered light, or not full of FOG yet, then it can simply be dropped back into the trap and removed at a later time or the next time the trap is serviced. Weighing the FOG capture device 110 allows for full utilization of the device reducing costs and any additional or unnecessary environmental waste.

At step 1040, in response to determining that the FOG capture device 110 is at the predetermined weight or at full capacity, the user may remove the FOG capture device by uncoupling the tether from the device. In some embodiments, the tether may also be uncoupled from the access point. With the FOG capture device 110 at full capacity, it may then be utilized as a carbon neutral fuel.

At step 1050, after the removal and when replacing the FOG capture device 110 in the secondary chamber of the grease trap, the device will be dropped in with at least one end of the tether affixed to the device for future removal.

Finally, at step 1060, a user may insert and guide or position the device into place through access point aperture using the end of the pole affixed with the triangular metal unit. Once the FOG capture device 110 is positioned across the exit pipe 120 the user may close the access point on a portion of the device in order to provide continuous pressure to hold the FOG capture device 110 securely on the water surface in front of or within the outlet 118 or exit pipe 120, thereby ensuring the flow of all water from the grease trap through the second tube 110 before entering the sewer system.

What is claimed is:

1. An apparatus for collection of fats, oil, and grease for utilization as a carbon neutral fuel comprising:
   a first porous container formed of a porous fabric;
   a second porous container formed of a porous fabric; and
   a grease trap having an inlet and an outlet, wherein the grease trap comprises a source of fats, oil and/or grease,
   wherein each of the first porous container and the second porous container comprises an absorbent material capable of absorbing a quantity of fats, oil and grease through the porous fabric of the first porous container and the second porous container, wherein the absorbent material comprises an organic absorbent material;
   wherein the first porous container and the absorbent material contained therein is positioned proximate the grease trap inlet, and the second porous container and the absorbent material contained therein is positioned proximate the grease trap outlet; and
   wherein the first porous container and the second porous container each comprises a plurality of pores with an apparent opening size (AOS) of 0.25 mm to 0.5 mm.

2. The apparatus of claim 1, wherein the absorbent material consists of at least one of sphagnum peat, mushroom compost, orange peels, and polypropylene.

3. The apparatus of claim 1, wherein the second porous container is positioned in a stationary manner intermediate the grease trap outlet and an exit pipe, wherein the second porous container covers an entire surface area of the exit pipe.

4. The apparatus of claim 3, wherein the second porous container includes a tether for allowing the second porous container to be lowered into and raised out of the source of fats, oil and/or grease and to be tethered proximate the source of fats, oil and/or grease.

5. The apparatus of claim 4, wherein the exit pipe comprises an access point having an opening for receiving the second porous container, wherein the access point comprises a hinged door for covering the opening, and wherein the second porous container is tethered to the hinged door and inserted into the opening.

6. A method of capturing fats, oil and/or grease for utilization as a carbon neutral fuel within the apparatus of claim 1, comprising the steps of:
providing a first porous container formed of a porous fabric, wherein the first porous container comprises a plurality of pores with an apparent opening size (AOS) of 0.25 mm to 0.5 mm;
providing a second porous container formed of a porous fabric, wherein the second porous container comprises a plurality of pores with an apparent opening size (AOS) of 0.25 mm to 0.5 mm;
positioning in each of the first porous container and the second porous container an absorbent material capable of absorbing a quantity of fats, oil and grease through the porous fabric of the first porous container and the second porous container, wherein the absorbent material comprises an organic absorbent material;
placing the first porous container and the absorbent material contained therein in the grease trap of the apparatus proximate a grease trap inlet, wherein the grease trap comprises a source of fats, oil and/or grease; and
placing the second porous container and the absorbent material contained therein in the grease trap of the apparatus proximate a grease trap outlet.

7. The method of claim 6, further comprising the steps of:
removing the first porous container of absorbent material and absorbed fat, oil and/or grease from the grease trap of the apparatus;
in response to removing the first porous container of absorbent material and absorbed fat, oil and/or grease from the grease trap, determining whether the first porous container is at a predetermined weight;
in response to determining the first porous container is at the predetermined weight, providing a third porous container formed of a porous fabric, wherein the third porous container comprises a plurality of pores with an apparent opening size (AOS) of 0.25 mm to 0.5 mm;
positioning in the third porous container an absorbent material capable of absorbing a quantity of fats, oil and grease through the porous fabric of the third porous container, wherein the absorbent material comprises an organic absorbent material;
placing the third porous container and the absorbent material contained therein in the grease trap of the apparatus proximate the grease trap inlet, wherein the grease trap comprises a source of fats, oil and/or grease;
removing the third porous container of absorbent material and absorbed fat, oil and/or grease from the grease trap of the apparatus; and
transporting the removed third porous container and the absorbent material, fats, oil and/or grease contained therein to a location for processing for utilization as a carbon neutral fuel.

8. The method of claim 6, further comprising the steps of:
removing the second porous container of absorbent material and absorbed fat, oil and/or grease from the grease trap of the apparatus;
in response to removing the second porous container of absorbent material and absorbed fat, oil and/or grease from the grease trap of the apparatus, determining whether the second porous container is at a predetermined weight;
in response to determining the second porous container is at the predetermined weight, providing a fourth porous container formed of a porous fabric, wherein the fourth porous container comprises a plurality of pores with an apparent opening size (AOS) of 0.25 mm to 0.5 mm;
positioning in the fourth porous container an absorbent material capable of absorbing a quantity of fats, oil and grease through the porous fabric of the fourth porous container, wherein the absorbent material comprises an organic hydrocarbon absorbent material;
placing the fourth porous container and the absorbent material contained therein in the grease trap of the apparatus proximate the grease trap outlet, wherein the grease trap comprises a source of fats, oil and/or grease;
removing the fourth porous container of absorbent material and absorbed fat, oil and/or grease from the grease trap of the apparatus; and
transporting the removed fourth porous container and the absorbent material, fats, oil and/or grease contained therein to a location for processing for utilization as a carbon neutral fuel.

9. The method of claim 6, further comprising the steps of:
removing the first porous container of absorbent material and absorbed fat, oil and/or grease from the grease trap of the apparatus;
in response to removing the first porous container of absorbent material and absorbed fat, oil and/or grease from the grease trap of the apparatus, determining whether the first porous container is at a predetermined weight;
in response to determining the first porous container is not at the predetermined weight, placing the first porous container and the absorbent material contained therein in the grease trap of the apparatus proximate the grease trap inlet, wherein the grease trap comprises a source of fats, oil and/or grease;
removing the first porous container of absorbent material and absorbed fat, oil and/or grease from the grease trap of the apparatus; and
transporting the removed first porous container and the absorbent material, fats, oil and/or grease contained therein to a location for processing for utilization as a carbon neutral fuel.

10. The method of claim 6, further comprising the steps of:
removing the second porous container of absorbent material and absorbed fat, oil and/or grease from the grease trap of the apparatus;
in response to removing the second porous container of absorbent material and absorbed fat, oil and/or grease from the grease trap of the apparatus, determining whether the second porous container is at a predetermined weight;
in response to determining the second porous container is not at the predetermined weight, placing the second porous container and the absorbent material contained therein in the grease trap of the apparatus proximate the grease trap outlet, wherein the grease trap of the apparatus comprises a source of fats, oil and/or grease;
removing the second porous container of absorbent material and absorbed fat, oil and/or grease from the grease trap of the apparatus;
in response to removing the second porous container of absorbent material and absorbed fat, oil and/or grease from the grease trap of the apparatus, determining whether the second porous container is at a predetermined weight;
in response to determining the second porous container is at the predetermined weight, transporting the removed second porous container and the absorbent material, fats, oil and/or grease contained therein to a location for processing for utilization as a carbon neutral fuel.

11. The method of claim 6, wherein:
placing the second porous container and the absorbent material contained therein in the grease trap of the apparatus proximate the grease trap outlet further comprises placing the second porous container intermediate the first porous container and the grease trap outlet.

12. The method of claim 6, wherein:
placing the second porous container and the absorbent material contained therein in the grease trap of the apparatus proximate the grease trap outlet further comprises placing the second porous container in a stationary manner intermediate the grease trap outlet and an exit pipe, wherein the second porous container covers an entire surface area of the exit pipe.

13. The method of claim 12, wherein placing the second porous container in a stationary manner intermediate the grease trap outlet and the exit pipe further comprises tethering the second porous container proximate the source of fats, oil and/or grease.

14. The method of claim 12, wherein the exit pipe comprises an access point having an opening for receiving the second porous container, and wherein the access point comprises a hinged door for covering the opening.

15. The method of claim 14, wherein placing the second porous container in a stationary manner intermediate the grease trap outlet and the exit pipe further comprises tethering the second porous container to the hinged door.

16. The method of claim 14, wherein placing the second porous container in a stationary manner intermediate the grease trap outlet and the exit pipe further comprises:
opening the hinged door;
positioning the second porous container in the opening with a portion of the second porous container positioned outside of the opening and intermediate an exterior surface of the exit pipe and the hinged door; and
closing the hinged door, wherein the closed hinged door holds the second porous container in the stationary manner.

17. The method of claim 14, wherein the hinged door comprises a self-closing hinged door.

18. The method of claim 6, wherein the absorbent material consists of at least one of sphagnum peat, mushroom compost, orange peels, and polypropylene.

19. The method of claim 6, wherein the absorbent material comprises a hydrophobic and oleophilic material configured to absorb between two to ten times its weight of fats, oil, and/or grease.

* * * * *